Feb. 13, 1923.

C. M. RODGERS ET AL.
REEL.
FILED MAY 31, 1921.

1,445,560.

INVENTORS
C. M. Rodgers
A. W. Wenger
BY
ATTORNEYS

Patented Feb. 13, 1923.

1,445,560

UNITED STATES PATENT OFFICE.

CLAUDE M. RODGERS AND ARTHUR W. WENGER, OF WARSAW, INDIANA.

REEL.

Application filed May 31, 1921. Serial No. 473,595.

*To all whom it may concern:*

Be it known that we, CLAUDE M. RODGERS and ARTHUR W. WENGER, citizens of the United States, and residents of the city of Warsaw, in the county of Kosciusko and State of Indiana, have invented a new and useful Improvement in Reels, of which the following is a full, clear, and exact description.

Our invention relates generally to fishing reels, and more particularly to reels used in casting operations, and it consists in the combinations, constructions and arrangements herein described and claimed.

An object of our invention is to provide a reel adapted to hold a line thereon so that air is permitted to circulate freely about the coils of the line to dry the same with the necessity for removing the line from the reel obviated.

A further object of our invention is to provide a reel having means for controlling the rotative movement of the line holding element of the device.

A further object of our invention is to provide a device in which the rotatable line holding element is formed of a single piece of metal or other suitable material.

A further object of our invention is to provide a reel having a rotatable line holding member and means for placing a tension on the rotatable member to decelerate the speed of rotation as desired.

A further object of our invention is to provide a device that is simple in construction, not likely to get out of order easily, and thoroughly practical commercially.

Other objects and advantages will appear in the following specification, and the novel features of the invention will be particularly pointed out in the appended claims.

Our invention is illustrated in the accompanying drawings, forming part of this application, in which—

Figure 1:
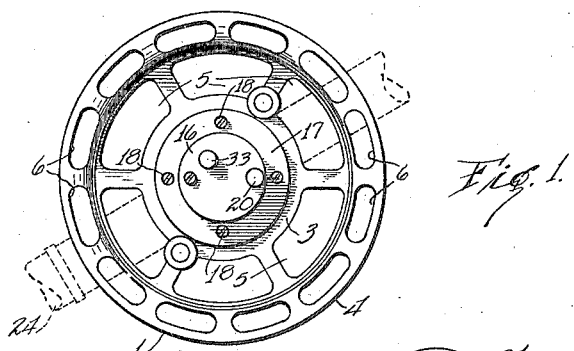
Fig. 1 is a side elevation of the device applied to a fishing rod.
Figure 2:
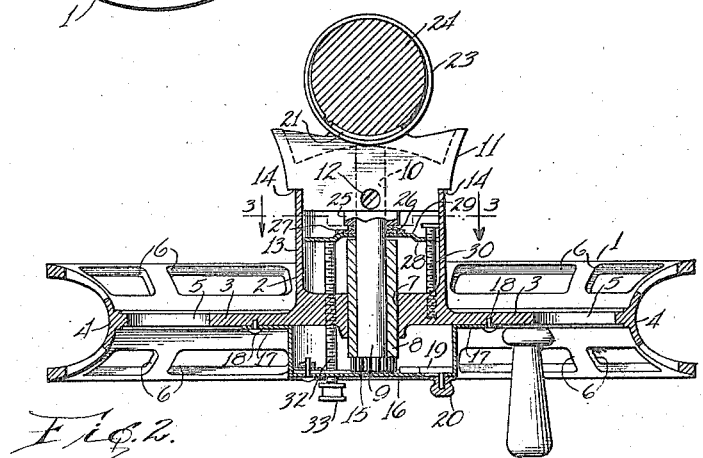
Fig. 2 is an enlarged transverse section through the mechanism shown in Fig. 1.
Figure 3:
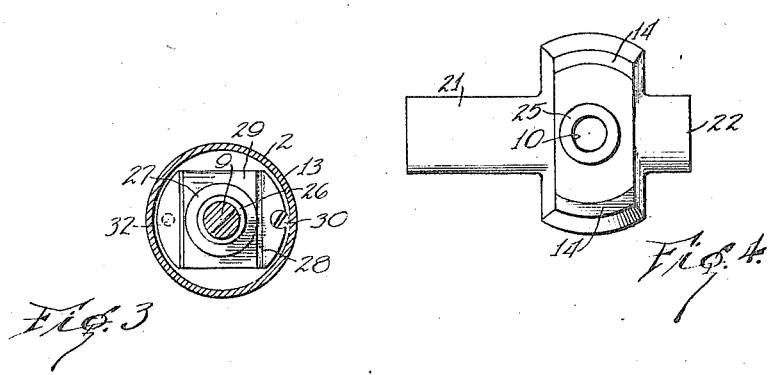
Fig. 3 is a section along the line 3—3 of Fig. 2.
Figure 4:
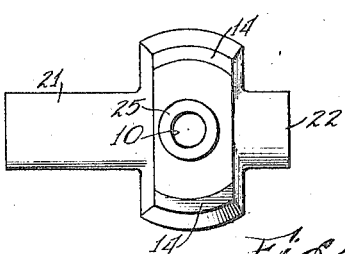
Fig. 4 is a plan view of a portion of the device.

In casting operation, when reels of an ordinary construction, of which we are aware, are used, the momentum of the rotating line holding element of the reel acquired through the casting of the bait must be overcome when the cast has been made by a tension placed on the rotatable element by the thumb of a fisherman. Otherwise, the rotatable member will continue to turn and the line will be unwound so as to interfere with the retrieving of the same, particularly when a strike has been made. It is well known that considerable difficulty has heretofore been encountered in controlling the operation of the rotatable member so as to stop the latter from turning at the proper time. It is therefore an object of our invention to provide mechanical means for controlling the rotative movement of the line holding element.

In carrying out our invention, we provide a line holding member 1 having the form of a wheel. The wheel or rotor 1 has a hub 2, a web 3 and a rim 4, these parts being formed integrally of any suitable material, such as a light metal. The wheel 1 is formed with a plurality of perforations 5 through the web and with perforations 6 through the rim so that air is permitted to circulate freely about the coils of a line wound thereon and the drying of the line may be accomplished with the necessity of removing the line from the rim obviated. The hub 2 is provided with a central bore 7 adapted to frictionally fit a sleeve 8. The sleeve 8 is rotatably mounted on a shaft 9 that is arranged with an end thereof projected into a socket 10 in a reel holding member 11. A set screw 12 maintains the shaft 9 within the socket 10. The hub 2 of the wheel 1 has an integral laterally extending housing 13 arranged to abut opposite arcuate shoulders 14—14 in the adjacent face of the reel holding member 11. A retaining member 15 having a notched peripheral edge is secured on the shaft 9 to prevent displacement of the sleeve 8, while permitting rotative movement of the latter. A cap 16 is formed with a flange 17 secured to the web 3 by screws 18 or the like. A slidable spring member 19 secured to the inner wall of the cap 16 may be moved through the agency of a knob or pin 20 selectively into and out of engagement with the notched retaining member 15. When the spring 19 engages the retaining member 15, a click will result.

It is to be observed that the reel holding member 11 is formed with opposite arms 21 and 22 which engage with rings 23 on a rod 24 to attach the reel to the rod. The reel holding member 11 has an integral cylindrical extension 25 from its outer face toward the adjacent end of the sleeve 8. A spacing washer 26 is interposed between a friction disk 27 and the end of the extension 25. A resilient friction disk 28 has an offset central portion 29 mounted on the shaft 9 between the friction disk 27 and the adjacent end of the sleeve 8. A retaining screw 30 projected through the resilient friction disk adjacent to one edge thereof secures the friction disk 28 to the hub 2 to rotate with the latter. The tension on the extension 25 is varied through the agency of an adjusting screw 32, the end of which is arranged to bear against the friction disk 28.

From the foregoing description of the various parts of the device, the operation thereof may be readily understood. The adjusting screw 32 is provided with a head 33 positioned exteriorly of the cap 15 and this head may be conveniently grasped and rotated to vary the tension on the friction disk 28 at will. Obviously, as the tension on the latter is increased, the spacing washer 26 will more closely engage the contiguous end wall of the extension 25 and will retard the rotative movement of the wheel 1. The tension may be regulated so that the rotation of the wheel 1 will be stopped when the cast has been completed. Furthermore, all "back lash" is precluded when the device is used.

It will be observed that the apertures 5 through the web 3 are spaced from the hub 2 so as to provide a continuous annular rest for the thumb of the fisherman and consequently the possibility of injury of the thumb, as by contact with a sharp edge, is reduced to a minimum when our improved device is used.

The device is simple in construction, and provides effective means for controlling the rotative movement of the line holding wheel so that even the most inexperienced caster may adjust the controlling mechanism that has been hereinbefore described to occasion the stopping of the rotative movement of the wheel when the cast has been completed.

We claim:

The combination with a fishing pole, a reel supporting member removably secured to said pole, said member having arcuate-shaped grooves, and an outwardly extending solid stub shaft centrally disposed with respect to said grooves, a reel having a hollow hub rotatably received in said grooves, a sleeve carried by said hub and being received in said stub shaft, a plate slidably carried by said stub shaft and being adapted to rotate with said hub, means for moving said plate into frictional engagement with said member, whereby the rotative movement of said reel is controlled, a pinion mounted on the free end of said shaft, a spring clip adapted to be brought into engagement with said pinion to retard movement of said reel, said reel having an integral U-shaped trough in its periphery, said trough having large openings therein, said hub merging in a gentle curve into the web of said reel, and said web having enlarged openings therein disposed adjacent to said trough, whereby the string carried by said reel will be effectually dried while remaining on the reel.

CLAUDE M. RODGERS.
A. W. WENGER.